United States Patent Office 3,355,439
Patented Nov. 28, 1967

3,355,439
POLYMERS OF COORDINATION COMPLEXES OF VINYLPHOSPHINES AND METAL SALTS, AND PROCESS FOR PREPARING SAME
Frank J. Welch, Charleston, and Herbert J. Paxton, Jr., Elkview, W. Va., assignors to Union Carbide Corporation, a corporation of New York
No Drawing. Filed Oct. 30, 1963, Ser. No. 320,005
13 Claims. (Cl. 260—80)

This invention relates to coordination complexes of vinylphosphines and metal salts, and to polymers of these complexes.

The coordination complexes of the instant invention are produced by reacting a suitable metal salt with a suitable vinylphosphine. These complexes can be represented by the formula:

$$MA_m \cdot X[R_2PCH=CH_2]$$

wherein M is a metal selected from the group consisting of metals present in Groups I–B, II–B, III–A, III–B, IV–A, IV–B, V–A, V–B, VI–B, VII–B, and VIII of the Periodic Table, and those metals of Group II–A of the Periodic Table having an atomic weight below 25; A is an acetate or a monovalent inorganic anion; R is a monovalent hydrocarbon radical, including aliphatic, alicyclic and aromatic, and substituted aliphatic, alicyclic and aromatic, said radical having from 1 to 20 carbon atoms, preferably from 1 to 10 carbon atoms; $m$ is an integer having a value equal to the valence of metal M; and X is an integer having a value equal to the coordination number of metal salt $MA_m$, usually 1. The Periodic Table referred to throughout this specification is the one appearing on pp. 58–59 of Lange's Handbook of Chemistry, Seventh Edition, 1949. Illustrative of M in the above formula are metals such as copper, magnesium, zinc, mercury, aluminum, tin, titanium, antimony, iron, nickel, cobalt, chromium, molybdenum, manganese, vanadium, palladium, uranium, plutonium, gold, zirconium, platinum, beryllium, and the like. Among the anions which are represented by A in the above formula are acetate, chloride, bromide, fluoride, iodide, nitrate, perchlorate, and the like. Representative of R in the above formula are radicals such as methyl, ethyl, vinyl, allyl, n-propyl, isopropyl, n-butyl, isobutyl, n-pentyl, n-hexyl, cyclohexyl, cyclohexenyl, 4-methylpentyl, n-heptyl, n-octyl, 2-ethylhexyl, n-nonyl, n-decyl, 2,2-dimethyldecyl, n-tridecyl, n-tetradecyl, n-pentadecyl, n-octadecyl, n-eicosyl, phenyl, tolyl, xylyl, naphthyl, and the like.

The metal salts which can be employed in preparing the novel coordination complexes of the instant invention can be represented by the formula:

$$MA_m$$

wherein M, A, and $m$ are as above defined. Illustrative of such metal salts are compounds such as copper acetate, copper chloride, copper bromide, copper fluoride, copper iodide, copper nitrate, copper perchlorate, magnesium acetate, magnesium chloride, magnesium bromide, magnesium fluoride, magnesium iodide, magnesium nitrate, magnesium perchlorate, zinc acetate, zince chloride, zinc bromide, zinc fluoride, zinc iodide, zinc nitrate, zinc perchlorate, mercury aceate, mercury chloride, mercury bromide, mercury fluoride, mercury iodide, mercury nitrate, mercury perchlorate, aluminum acetate, aluminum chloride, aluminum bromide, aluminum fluoride, aluminum iodide, aluminum nitrate, aluminum perchlorate, tin acetate, tin chloride, tin bromide, tin fluoride, tin iodide, tin nitrate, tin perchlorate, titanium acetate, titanium chloride, titanium bromide, titanium fluoride, titanium iodide, titanium nitrate, titanium perchlorate, antimony acetate, antimony chloride, antimony bromide, antimony fluoride, antimony iodide, antimony nitrate, antimony perchlorate, iron acetate, iron chloride, iron bromide, iron fluoride, iron iodide, iron nitrate, iron perchlorate, nickel acetate, nickel chloride, nickel bromide, nickel fluoride, nickel iodide, nickel nitrate, nickel perchlorate, cobalt acetate, cobalt chloride, cobalt bromide, cobalt fluoride, cobalt iodide, cobalt nitrate, cobalt perchlorate, chromium acetate, chromium chloride, chromium bromide, chromium fluoride, chromium iodide, chromium nitrate, chromium perchlorate, molybdenum acetate, molybdenum chloride, molybdenum bromide, molybdenum fluoride, molybdenum iodide, molybdenum nitrate, molybdenum perchlorate, manganese acetate, manganese chloride, manganese bromide, manganese fluoride, manganese iodide, manganese nitrate, manganese perchlorate, vanadium acetate, vanadium chloride, vanadium bromide, vanadium fluoride, vanadium iodide, vanadium nitrate, vanadium perchlorate, palladium acetate, palladium chloride, palladium bromide, palladium fluoride, palladium iodide, palladium nitrate, palladium perchlorate, uranium acetate, uranium chloride, uranium bromide, uranium fluoride, uranium iodide, uranium nitrate, uranium perchlorate, plutonium acetate, plutonium chloride, plutonium bromide, plutonium fluoride, plutonium iodide, plutonium nitrate, plutonium perchlorate, gold acetate, gold chloride, gold bromide, gold fluoride, gold iodide, gold nitrate, gold perchlorate, zirconium acetate, zirconium chloride, zirconium bromide, zirconium fluoride, zirconium iodide, zirconium nitrate, zirconium perchlorate, platinum acetate, platinum chloride, platinum bromide, platinum fluoride, platinum iodide, platinum nitrate, platinum perchlorate, beryllium acetate, beryllium chloride, beryllium bromide, beryllium fluoride, beryllium iodide, beryllium nitrate, beryllium perchlorate, and the like.

The vinylphosphines which can be employed in preparing the novel coordination complexes of the instant invention can be represented by the formula:

$$R_2PCH=CH_2$$

wherein R is as above defined. Illustrative of such vinylphosphines are compounds such as vinyldimethylphosphine, vinyldiethylphosphine, vinylmethylethylphosphine, trivinylphosphine, vinyldiallylphosphine, vinyldi-n-propylphosphine, vinyldiisopropylphosphine, vinyldi-n-butylphosphine, vinyldiisobutylphosphine, vinyldi-n-pentylphosphine, vinyldi-n-hexylphosphine, vinyldicyclohexylphosphine, vinyldicyclohexenylphosphine, vinyldi-4-methylpentylphosphine, vinyldi-n-heptylphosphine, vinyldi-n-octylphosphine, vinyldi-2-ethylhexylphosphine, vinyldi-i-nonylphosphine, vinyldi-n-decylphosphine, vinyldi-2,2-dimethyldecylphosphine, vinyldi-n-tridecylphosphine, vinyldi-n-tetradecylphosphine, vinyldi-n-pentadecylphosphine, vinyldi-n-octadecylphosphine, vinyldi-n-eicosylphosphine, vinyldiphenylphosphine, phenyldivinylphosphine, vinylditolylphosphine, vinyldixylylphosphine, vinyldinaphthylphosphine, and the like.

Reaction between a metal salt and a vinylphosphine according to the instant invention can be effected by heating an admixture of these materials in an inert atmosphere above their melting points and above the melting point of the resulting complex. If desired, reaction can be effected in an inert liquid organic solvent at temperatures ranging from as low as about −50° C. to as high as about 250° C., preferably from about 0° C. to about 100° C.

When the vinylphosphine is complexed with an acidic metal salt, for example an acidic Lewis acid salt, such as aluminum chloride, zinc chloride, stannic chloride, magnesium chloride, and the like, the complex which forms is usually catalyzed immediately in situ by the acidic salt and polymerizes to form the corresponding polymer. However, when some very weakly acidic or non-acidic metal salts, such as mercuric chloride, nickel chloride, copper chloride, silver chloride, and palladium chloride, and the like, are employed, the complex formed can be isolated and recovered in its monomeric state.

Both the unpolymerized and polymerized coordination complexes of the instant invention can be incorporated into various polymers by blending on a two-roll mill at a temperature of from about 30° C. to about 250° C. to impart to the base polymer improved combustion resistance. Such blends suitably contain from about 1 part by weight to about 30 parts by weight of the complex based on the total weight of the mixture. Among the polymers with which the coordination complexes can be blended are polyethylene, polypropylene, polystyrene, poly(methyl acrylate), poly(methyl methacrylate), poly(ethyl acrylate), polyacrylonitrile, poly(methacrylamide), and the like. If desired, the monomeric coordination complexes can sometimes be homopolymerized (as described below) before being blended with the base polymer, or interpolymerized with one or more polymerizable organic compounds and thus directly incorporated into the polymer.

When reaction between a metal salt and a vinylphosphine is effected in an inert liquid organic solvent according to the instant invention, the solvent employed can be a solvent for both the metal salt and the vinylphosphine, or for one of these reactants and the complex or complex polymer formed by the reaction. Suitable solvents which can be employed include alcohols such as ethanol, butanol, isopropanol, and the like, amides such as dimethylformamide, and the like, esters such as ethyl acetate, and the like, and nitriles such as acetonitrile, and the like. In general, an amount of solvent ranging from about 1 to about 100 times, preferably from about 4 to about 10 times, the weight of the reactants can be effectively employed.

Preferably the metal salt and the vinylphosphine are employed in a molar ratio of vinylphosphine to metal salt of about 1:1. However, greater of lesser amounts of either reactant, for example, amounts of vinylphosphine ranging from as little as 0.5 mole to as much as 4 moles per mole of metal salt present, can be also be employed.

Atmospheric pressure is usually employed in effecting reaction according to the process of the instant invention. However, pressures both above and below atmospheric pressure, for example pressures ranging from as low as 1 mm. Hg to as high as 10 atmospheres, can also be employed, whenever it is desirable to do so.

Many of the unpolymerized coordination complexes which can be isolated according to the instant invention can, because of the vinyl group present therein, be readily homopolymerized, or interpolymerized with one or more polymerizable organic compounds, such as ethylene, styrene, butadiene, methyl acrylate, methyl methacrylate, ethyl acrylate, vinyl acetate, vinyl chloride, vinylidene chloride, acrylonitrile, methacrylonitrile, vinylidene cyanide, acrylamide, methacrylamide, maleic anhydride, N-vinylacetamide, vinyl methyl ether, and the like. Polymers produced from complexes containing no unsaturated group other than the vinyl group are fusible, thermally stable, flame and solvent resistant thermoplastic polymers. Such polymers are useful in molding and extrusion applications, such as in the preparation of films, fibers and various molded objects, and can be used to provide a protective coating to various materials. Polymers produced from complexes containing an unsaturated polymerizable group in addition to the vinyl group are thermally stable, flame and solvent resistant thermosetting polymers useful as casting resins. However, unpolymerized complexes prepared from metal salts of metals of groups I–B and VIII of the Periodic Table act as polymerization inhibitors, so that polymers have only been successfully prepared from complexes of metal salts of metals of Groups II–A through VII–B of the Periodic Table.

The interpolymers obtained by interpolymerizing the unpolymerized coordination complexes of the instant invention can contain from as low as 0.1 mole percent to as high as 3 mole percent, usually from 0.2 mole percent to 1 mole percent, of the combined complex.

The unpolymerized coordination complexes of the instant invention can be homopolymerized by means of a cationic catalyst, or interpolymerized by means of a suitable vinyl polymerization catalyst, such as a catalyst capable of forming free radicals under the polymerization conditions employed. Generally, temperatures of from about —25° C. to about 200° C. are suitable. Known solvents can be employed in the polymerization mixture if desired. Typical of the cationic catalysts which can be employed are compounds such as boron trifluoride, aluminum chloride, zinc chloride, stannic chloride, magnesium chloride, and the like. Among the free radical catalysts which can be employed are oxygen, either alone or together with a trialkylboron, such as trimethylboron, triethylboron and tripropylboron; peroxides such as hydrogen peroxide, diethyl peroxide, dibenzoyl peroxide, distearyl peroxide, di-tertiary-butyl peroxide, tertiary-butyl hydroperoxide, diacetyl peroxide, distearoyl peroxide and acetyl benzoyl peroxide; azo compounds such as $\alpha,\alpha'$-azo-bis-isobutyronitrile and 2,2'-dicyanoazobenzene; percarbonates such as diisopropyl percarbonate and di-tertiary-butyl percarbonate; and peresters such as tertiary-butyl-perbenzoate and acetaldehyde monoperacetate. These catalysts are employed in amounts which are conventionally employed in the art, either individually or in various mixtures thereof. Thus such catalysts can be employed in an amount of from about 0.1 percent by weight to about 10 percent by weight, preferably from about 0.2 percent by weight to about 2 percent by weight, of the total amount of monomer present.

The following examples are set forth for purposes of illustration so that those skilled in the art may better understand this invention, and it should be understood that they are not to be construed as limiting this invention in any manner.

The term "reduced viscosity" ($I_R$), employed in the examples and throughout this specification, is a measure of the molecular weight of a polymer and may be defined by the equation:

$$I_R = \frac{\frac{\Delta N}{N_o}}{C}$$

wherein $\Delta N$ is the difference in seconds between the flow-time of a solution of polymer through a capillary viscometer and the flow-time of the solvent, $N_o$ represents the flow-time of the solvent, and $C$ is the concentration of polymer in said solution in grams per 100 milliliters of solvent. The value of $\Delta N/N_o$ is known as the specific viscosity. Reduced viscosity values in the examples and throughout the specification have reference to measurements made at 30° C. using a solution of 0.2 gram of polymer per 100 milliliters of solvent.

*Example 1*

A solution of 8.9 grams (0.042 mole) of vinyldiphenylphosphine in 30 milliliters of ethanol was mixed in a nitrogen atmosphere with a solution of 10.9 grams (0.040 mole) of mercuric chloride ($HgCl_2$) in 50 milliliters of ethanol. Eighteen (18) grams of a white, crystalline 1:1 coordination complex of mercuric chloride and vinyldiphenylphosphine immediately precipitated. The complex was recovered by filtration, washed with ethanol and dried in a vacuum desiccator. The dried complex had a melting point of 186–188° C., and began to decompose at 180° C.

*Analysis.*—Calculated for $C_{14}H_{13}PCl_2Hg$: C, 34.6%; H, 2.7%; Cl, 14.7%. Found: C, 36.0%; H, 2.9%; Cl, 14.3%.

When the procedure is repeated employing copper chloride, nickel chloride, and mercuric acetate, similar results are obtained.

Example 2

Four (4) grams of a 1:1 coordination complex of mercuric chloride and vinyldiphenylphosphine was dissolved in 30 milliliters of dimethylformamide and cooled to −15° C. under a nitrogen atmosphere. Seven (7) milliliters of a 20 percent by weight solution of boron trifluoride in diethyl ether was added to the cooled solution in a dropwise manner over a period of 16 hours. After the addition was complete, the resulting solution was warmed to 25° C. and then added to 700 milliliters of n-heptane. Four (4) grams of a white, sticky, solid homopolymer of the 1:1 complex precipitated. The homopolymer was recovered by filtration and dried in a vacuum desiccator. The homopolymer had a reduced viscosity of 0.027 in dimethylformamide.

Example 3

To a nitrogen-purged Pyrex polymerization tube were charged 8.0 milliliters of acrylonitrile, 0.3 gram of α,α′-azo-bis-isobutyronitrile, and a solution of 2.0 grams of a 1:1 coordination complex of mercuric chloride and vinyldiphenylphosphine in 10 milliliters of dimethylformamide. After purging the tube with nitrogen, the tube was sealed and rotated in a water bath maintained at a temperature of 50° C. for 24 hours. At the end of this time, the tube was opened and 500 milliliters of methanol were added to the contents thereof. The white solid copolymer which precipitated was washed twice with methanol, collected by filtration, and dried in a vacuum desiccator. About 6.5 grams of a copolymer of acrylonitrile and the 1:1 complex were recovered. This represented a conversion of about 65 percent. The copolymer had a reduced viscosity of 0.6 in dimethylformamide. A combined complex content of 14.3 percent by weight was present in the copolymer, as indicated by a chlorine analysis of 2.1 percent by weight.

The copolymer was easily molded into a plaque.

Example 4

To a nitrogen-purged Pyrex polymerization tube were charged 8.0 grams of styrene, 0.3 gram of α,α′-azo-bis-isobutyronitrile, and a solution of 2.0 grams of a 1:1 coordination complex of mercuric chloride and vinyldiphenylphosphine in 10 milliliters of dimethylformamide. After purging the tube with nitrogen, the tube was sealed and rotated in a water bath maintained at a temperature of 50° C. for 24 hours. At the end of this time, the tube was opened and 500 milliliters of methanol were added to the contents thereof. The copolymer which precipitated was washed twice with methanol, collected by filtration, and dried in a vacuum desiccator. About 5 grams of a copolymer of styrene and the 1:1 complex were recovered. This represented a conversion of about 50 percent. The copolymer had a reduced viscosity of 0.08 in dimethylformamide. A combined complex content of 16.3 percent by weight was present in the copolymer, as indicated by a chlorine analysis of 2.4 percent by weight.

Example 5

A solution of 8.9 grams (0.042 mole) of vinyldiphenylphosphine in 20 milliliters of ethanol was mixed in a nitrogen atmosphere with a solution of 2.7 grams (0.02 mole) of zinc chloride ($ZnCl_2$) in 20 milliliters of ethanol. On standing, a white, solid homopolymer of a 1:1 coordination complex of zinc chloride and vinyldiphenylphosphine precipitated. When the alcohol was evaporated, an additional amount of homopolymer was obtained as a tacky resin. Both resins were free of vinyl unsaturation, as shown by their infrared spectra.

The precipitated polymer began to soften at 184° C. but did not completely melt below 250° C.

*Analysis.*—Theoretical: C, 48.3%; H, 3.74%. Found: C, 49.1%; H, 4.3%.

The polymer obtained by evaporation had a reduced viscosity of 0.05 in ethylene dichloride.

When the procedure is repeated employing magnesium chloride, aluminum chloride, stannic chloride, titanium chloride, antimony chloride, vanadium chloride, chromium chloride, and manganese chloride, similar results are obtained.

Example 6

A solution of 8.9 grams (0.042 mole) of vinyldiphenylphosphine in 20 milliliters of ethanol was mixed in a nitrogen atmosphere with a solution of 1.9 grams (0.02 mole) of magnesium chloride ($MgCl_2$) in 10 milliliters of ethanol. The resulting solution was refluxed for 30 minutes, and then cooled to −20° C., causing some precipitation. The remaining solution was then evaporated and a tacky, yellow, solid homopolymer of a 1:1 coordination complex of magnesium chloride and vinyldiphenylphosphine was obtained. The homopolymer was free of vinyl unsaturation, as shown by its infrared spectrum.

What is claimed is:

1. A normally solid addition polymer of a coordination complex represented by the formula $$MA_m(R_2PCH=CH_2)_x$$

wherein M is a metal selected from the group consisting of the metals present in Group II–B of the Periodic Table; A is a member selected from the group consisting of acetate and monovalent inorganic anions; R is a monovalent hydrocarbon radical having from 1 to 20 carbon atoms; m is an integer having a value equal to the valance of metal M; and x is an integer having a value equal to the coordination number of metal salt $MA_m$.

2. A normally solid addition polymer of a coordination complex represented by the formula $$MA_m(R_2PCH=CH_2)$$

wherein M is a metal selected from the group consisting of the metals present in Group II–B of the Periodic Table; A is a member selected from the group consisting of acetate and monovalent inorganic anions; R is a monovalent hydrocarbon radical having from 1 to 10 carbon atoms; and m is an integer having a value equal to the valance of metal M.

3. A normally solid addition homopolymer of a 1:1 coordination complex of mercuric chloride and vinyldiphenylphosphine.

4. A normally solid addition copolymer of acrylonitrile and a 1:1 coordination complex of mercuric chloride and vinyldiphenylphosphine.

5. A normally solid addition copolymer of styrene and a 1:1 coordination complex of mercuric chloride and vinyldiphenylphosphine.

6. A normally solid addition homopolymer of a 1:1 coordination complex of mercuric chloride and vinyldiphosphine.

7. A process which comprises homopolymerizing, by means of a cationic catalyst, a coordination complex represented by the formula $$MA_m(R_2PCH=CH_2)_x$$

wherein M is mercury; A is a member selected from the group consisting of acetate and monovalent inorganic anions; R is a monovalent hydrocarbon radical having from 1 to 20 carbon atoms; m is an integer having a value equal to the valence of M; and x is an integer having a value equal to the coordination number of mercury salt $MA_m$; said homopolymerization being effected at a temperature of from about −25° C. to about 200° C.

8. A process which comprises homopolymerizing, by means of a cationic catalyst, a coordination complex represented by the formula $$MA_m(R_2PCH=CH_2)$$

wherein M is mercury; A is a member selected from the group consisting of acetate and monovalent inorganic anions; R is a monovalent hydrocarbon radical having from 1 to 10 carbon atoms; and $m$ is an integer having a value equal to the valence of M; said homopolymerization being effected at a temperature of from about $-25°$ C. to about $200°$ C.

9. A process which comprises homopolymerizing a 1:1 coordination complex of mercuric chloride and vinyldiphenylphosphine by means of a cationic catalyst, said homopolymerization being effected at a temperature of from about $-25°$ C. to about $200°$ C.

10. A process which comprises polymerizing acrylonitrile with a 1:1 coordination complex of mercuric chloride and vinyldiphenylphosphine by means of a free radical catalyst, said polymerization being effected at a temperature of from about $-25°$ C. to about $200°$ C.

11. A process which comprises polymerizing styrene with a 1:1 coordination complex of mercuric chloride and vinyldiphenylphosphine by means of a free radical catalyst, said polymerization being effected at a temperature of from about $-25°$ C. to about $200°$ C.

12. A process which comprises interpolymerizing, by means of a free radical catalyst, an ethylenically unsaturated polymerizable organic compound and a coordination complex represented by the formula $$MA_m(R_2PCH=CH_2)_x$$

wherein M is mercury; A is a member selected from the group consisting of acetate and monovalent inorganic anions; R is a monovalent hydrocarbon radical having from 1 to 20 carbon atoms; $m$ is an integer having a value equal to the valence of M; and $x$ is an integer having a value equal to the coordination number of mercury salt $MA_m$; said interpolymerization being effected at a temperature of from about $-25°$ C. to about $200°$ C.

13. A process which comprises interpolymerizing, by means a free radical catalyst, an ethylenically unsaturated polymerizable organic compound and a coordination complex represented by the formula $$MA_m(R_2PCH=CH_2)$$

wherein M is mercury; A is a member selected from the group consisting of acetate and monovalent inorganic anions; R is a monovalent hydrocarbon radical having from 1 to 10 carbon atoms; and $m$ is an integer having a value equal to the valence of M; said interpolymerization being effected at a temperature of from about $-25°$ C. to about $200°$ C.

References Cited

UNITED STATES PATENTS

| | | | |
|---|---|---|---|
| 3,105,064 | 9/1963 | Kramer | 260—88.1 |
| 3,160,666 | 12/1964 | Ramsder | 260—88.1 |

FOREIGN PATENTS

| | | |
|---|---|---|
| 869,528 | 5/1961 | Great Britain. |

OTHER REFERENCES

Jones et al., Chemical Society Journal, 1947, Pt. II pp. 1446–1450.

Browing et al., Chemical Society Journal, March 1962, pp. 693–703, pp. 701 and 702 particularly relied on.

JOSEPH L. SCHOFER, *Primary Examiner.*

JAMES A. SEIDLECK, *Examiner.*

L. WOLF, *Assistant Examiner.*